United States Patent [19]

Weisberg

[11] Patent Number: 4,477,490

[45] Date of Patent: Oct. 16, 1984

[54] ASBESTOS ABATEMENT COATING SYSTEM

[76] Inventor: Irving H. Weisberg, 44 Park La., Park Ridge, Ill. 60068

[21] Appl. No.: 470,156

[22] Filed: Feb. 28, 1983

[51] Int. Cl.³ .............................. B05C 1/16; B05D 5/10
[52] U.S. Cl. .................................. 427/136; 427/393.6; 427/397.8; 427/407.1
[58] Field of Search ................. 427/136, 407.1, 397.8, 427/393.6, 344, 426, 421, 204, 214, 402, 403; 405/263, 264

[56] References Cited

U.S. PATENT DOCUMENTS

| | | | |
|---|---|---|---|
| 2,003,850 | 6/1938 | Alton | 427/214 |
| 2,140,634 | 12/1938 | Komlos | 427/204 |
| 2,201,840 | 5/1940 | Venable | 427/393.6 |
| 2,716,619 | 8/1955 | Jobbins et al. | 427/393.6 |
| 3,580,883 | 5/1971 | Kasahara et al. | 405/264 |
| 4,072,019 | 2/1978 | Pearson | 405/264 |
| 4,354,875 | 10/1982 | Powers et al. | 405/264 |
| 4,369,203 | 1/1983 | Hansen | 427/393.6 |

OTHER PUBLICATIONS

Protective Barriers for Containment of Toxic Materials, pp. 281–287, R. Fung.

Primary Examiner—Sadie L. Childs
Attorney, Agent, or Firm—John S. Fosse

[57] ABSTRACT

A process for bonding particulate siliceous contaminants, such as asbestos fibers and the like, with a soil surface layer comprises infusing the contaminated soil layer with an aqueous solution of a soluble silicate prepolymer and with an inorganic polyvalent cation catalyst. Following the cure and polymerization of the silicate prepolymer, an abrasion-resistant and impact-absorbent topcoating layer of resinous copolymeric materials is applied to the surface of the silicate-bonded soil layer.

10 Claims, No Drawings

ASBESTOS ABATEMENT COATING SYSTEM

FIELD OF THE INVENTION

This invention relates generally to means for controlling particulate contamination of the environment and especially to means for trapping particulate contaminants such as asbestos within a surface soil matrix.

BACKGROUND OF THE INVENTION

The naturally occurring, fibrous, magnesium silicate mineral which is commonly referred to as asbestos has long been used for thermal insulation, most often in high-temperature service or where fireproofing is required. However, air-borne fibers and other particles of asbestos have proved to be a major lung irritant capable of causing the serious and frequently fatal disease known as asbestosis among chronically exposed workers. An especially potent hazard has arisen in connection with such confined regions as building crawl spaces, tunnels, and storage areas which have dirt floors and where asbestos has been installed as furnace pipe insulation, steel girder insulation and the like. In these confined spaces, asbestos particles can readily be deposited inadvertently on the dirt floor during repair work activities for example. In other instances, asbestos may have contaminated the soil prior to or during building construction. In either event, the asbestos-laden soil thereafter serves as a permanent source of atmospheric recontamination, sometimes when protective breathing devices are erroneously thought to be unnecessary. In addition, paving over such contaminated soil with concrete or asphalt has proved exceptionally costly and sometimes physically impractical.

SUMMARY OF THE INVENTION

The present invention overcomes the limitations of the prior art by providing a comparatively inexpensive, easily applied, two-step treatment for soil surfaces which bonds asbestos and other toxic contaminants in place. Specifically, the method of the invention contemplates the infusion of a contaminated soil surface with an aqueous solution of soluble silicate prepolymer and with an inorganic polyvalent cation catalyst for the silicate prepolymer. After the silicate material has cured and polymerized to form a matrix in which the contaminant particles are chemically bonded, an abrasion-resistant and impact-absorbent topcoat layer of resinous copolymeric materials is applied. Sand or other grit may be incorporated in the topcoat to provide a traction surface.

Accordingly, a general object of the present invention is to provide a new and improved coating process for sealing soil surfaces that have been contaminated with asbestos particles or the like.

Another broad object of the invention is to provide a process for bonding particulate siliceous contaminants, such as asbestos fibers and the like, with a soil surface layer upon which they have precipitated or with which they have become admixed.

Another object of the invention is to provide a process of the type described in which the contaminated particles are chemically bonded into a water-resistant, non-combustible matrix which is non-biodegradable and therefore of substantial permanence.

These and other objects and features of the invention will become more apparent from a consideration of the following descriptions.

DETAILED DESCRIPTION OF THE INVENTION

In accordance with the procedures of the present invention, a soil surface layer which has been contaminated with asbestos or like siliceous particles is first infused with an aqueous solution of a soluble silicate prepolymer. Preferably, the selected substrate soil layer is relatively dry, or at least not waterlogged, in order that the silicate solution can be simply surface sprayed to achieve rapid permeation of the contaminated strata. Comparatively alkaline soils and soils with relatively high chloride ion content may be successfully treated with the silicate prepolymer system of the invention.

The silicate prepolymer which is employed in the present invention is selected to be an aqueous liquid in order to facilitate its handling and its dispersal throughout the contaminated soil layer. Water solution also promotes both polymerization of the silicate anions and reaction of these anions with the silicate moieties in both the soil mineral material of the substrate and the contaminant particles. Aqueous sodium silicate solutions have proved eminently satisfactory for this purpose; and weight ratios of $SiO_2$ to $Na_2O$ of from about 2.50 to about 3.75, preferably greater than 3.0, in these solutions are advantageous in the practice of the invention. Corresponding solution densities range from about 35°Bé to about 59°Bé with solids contents ranging from about 20 to about 55 percent by weight. One particularly advantageous sodium silicate solution has an $SiO_2$ to $Na_2O$ ratio of about 3.2 with a density of 40°Bé. As will be appreciated, sodium silicate glasses may be dissolved to form these solutions, or the solutions may be formed directly by fusing sodium carbonate and specially selected silica sands at high temperature, the resulting product being dissolved in sodium hydroxide to produce the hydrated sodium silicate.

The present invention contemplates that the aqueous silicate serve as a prepolymer and be insolubilized in situ by means of a suitable inorganic reactant such as a polyvalent cation substance. For example, aqueous sodium silicate has been usefully reacted by calcium chloride to form an insoluble matrix; and calcium chloride is an inexpensive and particularly advantageous reactant for use in the practice of the present invention, especially where a high load-bearing capacity is desired. The polyvalent inorganic catalyst may be incorporated with the aqueous silicate at the time of infusion into the contaminated soil layer, although it is preferably infused separately and subsequently to the infusion with the silicate in time-delayed sequence therewith. Suitable solutions of calcium chloride for purposes of the present invention exhibit solids contents of from about 30 percent to about 50 percent by weight.

The topcoat composition of the invention comprises a solution, emulsion or dispersion of a suitable film-forming organic resin; and a water vehicle is selected for at least the base layer of the topcoating in order for it to be generally compatible with the primary, silicate reaction product. One eminently useful film-forming material, especially for indoor applications, comprises a ternary polymer of vinyl chloride, vinyl acetate and a suitable acrylic monomer in substantially equimolar amounts.

Terpolymers derived from acrylic and methacrylic esters are advantageously polymerized with the vinyl monomers to provide a film-forming resin which is highly resistant to heat, light, abrasion, mechanical impact and weathering and which exhibits excellent freeze/thaw characteristics. Suitable acrylic monomers include methyl acrylate, ethyl acrylate, butyl acrylate, 2-ethylhexyl acrylate, methyl methacrylate, ethyl methacrylate, isobutyl methacrylate, butyl methacrylate, lauryl methacrylate, stearyl methacrylate and 1,3-butylene dimethacrylate, as well as methacrylic monomers incorporating pendant amino groups. In general, the resultant terpolymers are softer, tougher and more extensible as the molecular weight increases; and accordingly, molecular weights on the order of 10,000 are preferred.

The terpolymer material is combined with a conventional emulsifier to provide a coating composition with a solids content of about 50–60 percent by weight; and various additives may also be incorporated, such as carbon black, packaging preservatives such as 2-(hydroxymethyl)amino-2-methyl propanol, and mildewicides such as 3-iodo-2-propanyl butyl carbamate.

Usefully, a sufficient amount of the topcoat material is applied to the contaminated, silicate-treated soil surface to produce a residue approximately 10 mils in thickness; and while the resin polymer is still moist, common sand or some other suitable, inert, traction grit is desirably scattered over the surface and a second application of the topcoating applied over the abrasive.

A typical indoor application procedure, in accordance with the invention, will be commenced by first removing accumulated debris from the contaminated soil surface area. The soil should be comparatively dry and no scarification of the surface is necessary unless it has been heavily compacted. The silicate prepolymer solution will then be sprayed over the ground until it is visibly saturated. Creating puddles should be avoided. Permeation of the soil strata will then be allowed to take place for from twenty minutes to about one hour; and thereafter, the polyvalent cation catalyst solution will be sprayed on the ground surface until saturation is again reached. Chemical reaction will then be allowed to take place for a period of about twelve hours, conveniently overnight.

After the silicate material has polymerized and chemically reacted with the contaminant substance or substances, the topcoat composition will be spray-applied to a thickness of about 18 mils wet (10 mils dry); and if a traction surface is desired, coarse silica sand will then by spread by hand using a sweeping motion of the arm. Application of traction grit imparts surface hardness and additional protection to the silicate-bonded layer. A second spraying of the topcoat composition will be applied; and the composite topcoat allowed to air dry for a period of about twenty-four hours.

The described procedure creates a non-skid, monolithic surface with a consolidation of the contaminated surface strata up to approximatley three-quarters of an inch in depth. The finished surface is highly resistant to the action of water and solvents and withstands above-average physical abuse such as the movement thereover of heavy equipment in the course of maintenance operations.

The penetrating inorganic sealant also acts to encapsulate various reactive entities in the soil surface, such as free hydrogen ion or free hydroxyl ion for example, which would otherwise interfere with the topcoat materials. The silicate bonding of the invention thus stabilizes the impregnated strata chemically for reception of the organic topcoating.

In situations where abatement of the airborne contamination from an outdoor site is desired, for instance the dust from uranium mill tailing dumps, a secondary topcoating treatment is employed in order to provide greater resistance to degradation by such atmospheric forces as the repeated ponding of rain or runoff water. A useful secondary topcoating material comprises a copolymer of vinyl chloride and vinyl acetate resins in solvent solution containing approximately 20 percent solids by volume. The solvent is conveniently made up of equal volumes of methyl ethyl ketone and cellosolve acetate; and in addition, a phthalate or phosphate plasticizer is advantageously incorporated at a level of about two to about five percent. Moreover, propylene oxide may be included at an additive level of about one to about three percent and suitable pigments may be added as desired. The resultant film is highly resistant to alkalies, mineral acids, alcohols, greases, oils and aliphatic hydrocarbons and exhibits excellent toughness and flexibility and has low water vapor transmission when applied at a dry film thickness of 0.001 inches.

While particular embodiments of the invention have been described hereinabove, it should be understood, of course, that the invention is not limited thereto since many modifications may be made. It is, therefore, contemplated to cover by the present application any such modifications as fall within the spirit and scope of the appended claims.

The invention is claimed as follows:

1. A process for bonding finely divided, particulate in-place contaminants, such as asbestos fibers to a soil surface layer upon which the contaminants have precipitated or with which the contaminants have become admixed, comprising the steps of: infusing the contaminated soil surface layer with an aqueous solution of a soluble silicate prepolymer and with an inorganic polyvalent cation catalyst for said silicate prepolymer; allowing said silicate prepolymer to cure and polymerize and to insolubilize in-situ in said contaminated soil layer to form a matrix in which silicate anions in said silicate prepolymer are chemically bonded with silicate moieties in both the contaminated soil layer and the asbestos fibers, said matrix encapsulating reactive entities in said soil layer which otherwise would interfere with a subsequently applied topcoat layer;

and applying an abrasion-resistant and impact-absorbent topcoat layer of resinous material to the surface of the infused and bonded soil layer.

2. The process according to claim 1 wherein said silicate prepolymer has an $SiO_2$ to $Na_2O$ ratio of from about 2.50 to about 3.75.

3. The process according to claim 2 wherein said $SiO_2$ to $Na_2O$ ratio is greater than 3.0.

4. The process according to claim 1, wherein said resinous material is a ternary polymer of vinyl chloride, vinyl acetate and an acrylic monomer.

5. The process according to claim 4 wherein said monomers are present in substantially equimolar amounts.

6. The process according to claim 4 wherein said resinous material is applied as a latex emulsion.

7. The process according to claim 1 wherein said inorganic catalyst is calcium chloride.

8. The process according to claim 7 wherein said calcium chloride catalyst is applied in water solution separately and subsequently to infusion of the soil surface layer with the aqueous silicate solution.

9. The process according to claim 1 wherein said topcoat layer includes a base coat of water-based resinous material and secondary coat of solvent-based resinous material.

10. The process according to claim 9 wherein said secondary coating material is a copolymer of vinyl chloride and vinyl acetate.

* * * * *